Patented Dec. 15, 1942

2,305,550

UNITED STATES PATENT OFFICE 2,305,550

PROCESS FOR RECONDITIONING USED SOLUTIZER SOLUTIONS

Alan C. Nixon, San Francisco, and Orris L. Davis, Oakland, Calif., assignors to Shell Development Company, San Francisco, Calif., a corporation of Delaware No Drawing. Application May 27, 1941, Serial No. 395,390

10 Claims. (Cl. 252—192)

This invention relates to the art of refining hydrocarbons by extraction with so-called solutizer solutions, and more particularly to a method for reconditioning solutizer solution. Specifically it is concerned with a method for treating a contaminated solutizer solution with a solid magnesium oxide, whereby gums and resinous emulsifiers are removed.

The solutizer process by means of which mercaptans and other weak organic acids contained in sour hydrocarbon distillates, and more particularly in gasoline distillates, are extracted with solutizer solution, i. e. aqueous solutions of alkali metal hydroxides containing solutizers, is well known. The solutizer process has been described, and the several compounds particularly suitable as solutizers have been enumerated in a series of patents and patent applications, as well as in the general literature, for example, in the Yabroff et al. U. S. Patents 2,149,379—2,149,380—2,152,166—2,152,720—2,152,723—2,164,851—2,186,398—2,202,039—2,223,798—2,229,995; Refiner and Natural Gasoline Manufacturer, May 1939, pages 171 to 176 and March 1940, pages 73 to 76, Industrial and Engineering Chemistry, vol. 32, pages 257 to 262, February 1940, Chemical and Metallurgical Engineering, vol. 47, pages 776 to 778, November 1940, Oil and Gas Journal, vol. 39, No. 26, pages 55 to 56, November 7, 1940, etc.

In principle, a solutizer solution could be used indefinitely by continually regenerating it as by steaming. In practice, however, solutions used a long time tend to form relatively stable emulsions with the hydrocarbon oil under treatment probably due to gradual accumulation of emulsifiers believed to be resinous substances which emulsions either reduce the through-put due to retarded settling or cause the carry-over of valuable solutizer. Coalescing the entrained droplets by contact with fine steel wool or other solids may not always remedy the situation. It is in such solutions used continuously and for a very long period in a solutizer plant that our reconditioning process is particularly useful.

The exact source and chemical composition of the emulsifier are not known. It appears to be a gummy material of a resinous nature. Possible sources of it include cracked gasoline feeds containing dissolved gums, oxidation of small amounts of cracked gasoline dissolved in the solution, oxidation of portions of solutizer solution such as alkyl phenols which may purposely form part of the solutizer solution or which may accumulate in solutizer solutions when cracked gasoline feeds are treated.

The object of this invention is to facilitate th treatment of hydrocarbon distillates by means of solutizer solutions. Another purpose is to decrease the costs of operation in solutizer plants by minimizing or preventing losses of valuable solutizer which are suffered when contaminated solutions must be discarded. Still another purpose is to decrease emulsion and foaming difficulties in solutizer plants. A more particular purpose is to provide a method for the removal of resinous emulsifiers and troublesome solids from used solutizer solutions.

Our invention is based on the discovery that resinous emulsifiers which accumulate in used solutizer solutions may be removed by subjecting the said alkaline solutizer solution to a treatment with solid magnesium oxide, thereby rendering said solution clean and again suitable for use in the solutizer process for the extraction of mercaptans.

In carrying out our invention, a contaminated solutizer solution containing a resinous emulsifier is subjected to a treatment with a solid adsorbent comprising magnesium oxide to adsorb resinous emulsifier and other troublesome impurities, and to form a suspension of solids in the solution. The solid adsorbent together with the adsorbed emulsifier are then separated, and the resulting clean solutizer solution is removed, ready to be reused.

The adsorbent may consist entirely of MgO or may contain different amounts of activated carbon. In general, mixtures of MgO containing a minor portion of activated carbon are preferred. Further, the adsorbent may be mixed with clays or inert solids such as other substantially water insoluble metal oxides, etc.

By a contaminated solutizer solution we mean one containing an emulsifier which has slowly accumulated during the regeneration treatment and which is in solution or colloidally dispersed thereby causing said solution to have a tendency to form emulsions which may be relatively stable when it is mixed with gasoline in the course of the treatment or to foam excessively when the spent solution is being steam stripped thereby hampering the smooth operation of a solutizer plant.

The MgO and activated carbon used as adsorbents in the process may be the ordinary commercial grades of these substances in powdered form. The particle size of the solid adsorbent is to be considered, since the ability of the solid to adsorb increases as its particle size decreases. On the other hand, difficulties in separation may arise if the particle size is too small. It will usually be found satisfactory to use a powdered adsorbent of a fineness such that the larger portion of it passes through a 200 mesh screen.

The effectiveness of the removal of the undesirable contaminants is dependent on two factors: the concentration of alkali metal hydroxide in the contaminated solution and the amount of solid adsorbent which is added. The effectiveness of the treatment for a particular amount of adsorbent generally increases to a maximum as the dilution is increased, but the treatment of extremely diluted solutions in general is not practical due to the cost of reconcentrating such solutions. On the other hand, if the concentration of alkali metal hydroxide is high, little improvement will in general be realized even when relatively large amounts of solid adsorbent are used.

Normally solutizer solutions after having been steam stripped are at least 2 normal with respect to alkali metal hydroxide. At the time the solution is treated with the adsorbent it should contain alkali metal hydroxide in a concentration, preferably below 2.5 normal and above 0.5 normal, concentration between 2.0 and 1.0 normal in general being most practical. Thus when starting out with a solutizer solution which contains alkali metal hydroxide in concentration of about 6 normal as is most usually used, it may be advantageous to carry out the treatment in a dilution of at least 3:1 water, preferably distilled water, to solutizer solution. The amount of solid adsorbent to be used may vary between .25% and 1.5% by weight of the diluted solutizer solution. In general, the greater the dilution the smaller will be the amount of adsorbent to be used.

Since the treatment is much less effective if the magnesium adsorbent is the slaked form, i. e. Mg(OH)$_2$, the unslaked form, i. e. MgO, should be used, and in order to avoid its slaking, the adsorption should be carried out in a solution that is cold or at least one that is not heated substantially above normal room temperature.

The method of contacting the solution with the adsorbent should be one enabling intimate contact, so as to cause entrainment of the resinous emulsifier with the adsorbent and its separation from the cleansed solution. The adsorption may be carried out by mixing the powdered adsorbent dry or in the form of a slurry with the solution and separating the solid by settling, filtering, centrifuging, etc. Or else, we may percolate the solution through a bed of adsorbent in granular form. The first of these two methods is usually preferred. The contacting may be continuous, or batchwise, and may be resorted to whenever the emulsifier content has built up to proportions which under the particular conditions in the plant may prove unfavorable. The mixture should be agitated during treatment as by stirring.

The following explanation and examples illustrate the effectiveness of our treatment:

When solutizer solution and gasoline are passed in counter-current flow through an extraction tower in which the aqueous phase is continuous, an emulsion of the oil-in-water type is formed which collects at the top of the solutizer solution. A similar type of emulsion can be formed by stirring solutizer solution and gasoline together, and a stirrer test was accordingly devised whereby small amounts of solutizer solution and gasoline could be caused to form an emulsion under controlled conditions, and the time of settling measured.

*Example 1*

A full-range cracked gasoline was stirred vigorously under the above controlled conditions with a contaminated aqueous solutizer solution containing potassium hydroxide 6 normal, potassium isobutyrate 1.6 normal, and potassium phenolate .7 normal. The settling time (time necessary for the separation of the two phases) was eight hours. The separation was not clean, a rag remaining after settling. Another portion of the same contaminated solutizer solution was diluted with 3 volumes of water and contacted with about 0.75 by weight (based on diluted solutizer solution) of powdered magnesium oxide. The mixture was centrifuged for fifteen minutes at fifteen hundred R. P. M., filtered through a sintered glass filter and then reconcentrated by boiling. The reconcentrated solution was then stirred with the same full range cracked gasoline and the settling time was found to have dropped to twelve minutes. The phases separated cleanly and no rag remained.

*Example 2*

The above contaminated diluted solutizer solution was treated with a solid adsorbent comprising .5% by weight magnesium oxide and .25% by weight activated carbon. The treated solution was filtered and reconcentrated and was then agitated with the same cracked gasoline and under the conditions of Example 1.

The settling time was in this case reduced to about nine minutes, with a clean break.

We claim as our invention:

1. In a process for reconditioning an aqueous alkali metal hydroxide solution containing a solubility promoter for mercaptans and a resinous emulsifier accumulated in the course of treating hydrocarbon distillates with said solution, the steps comprising contacting said solution with a small amount of a solid adsorbent comprising magnesium oxide, under conditions to entrain the resinous emulsifier with the adsorbent, and separating said adsorbent containing entrained emulsifier from said solution, the latter having retained said solubility promoter.

2. The process of claim 1 wherein the concentration of the alkali metal hydroxide solution is between 2.5N and .5N.

3. The proces of claim 1 wherein the concentration of the alkali metal hydroxide solution is between 2.0N and 1.0N.

4. The process of claim 1 in which the said amount is between .25% and 1.5% by weight of said solution.

5. In a process for reconditioning an aqueous akali metal hydroxide solution containing a solubility promoter for mercaptans and a resinous emulsifier accumulated in the course of treating hydrocarbon distillates with said solution, the steps comprising contacting said solution with a small amount of a solid adsorbent comprising magnesium oxide and activated carbon, under conditions to entrain the resinous emulsifier with the adsorbent and separating said adsorbent containing entrained emulsifier from said solution, the latter having retained said solubility promoter.

6. The process of claim 5 wherein the solid adsorbent comprises a major proportion of MgO and a minor proportion of activated carbon.

7. In a process for reconditioning an aqueous solution of alkali metal hydroxide having a concentration above 2.5N and containing a solubility promoter for mercaptans and a resinous emulsifier accumulated in the course of treating hydrocarbon distillates with said solution, the steps comprising diluting said solution with water to a concentration of the alkali metal hydroxide between 2.5 and .5N, contacting resulting diluted aqueous solution with a small amount of a solid adsorbent comprising magnesium oxide, under conditions to entrain the resinous emulsifier with the adsorbent, and separating said adsorbent containing entrained emulsifier from said solution, the latter having retained said solubility promoter.

8. The process of claim 7 wherein the water of dilution is distilled water.

9. The process of claim 7 wherein the metal hydroxide content of the concentrated solution is about 6N, and that of the diluted solution is about 1.5N.

10. In a process for reconditioning an aqueous solution of an alkali metal hydroxide having a concentration of about 6N and containing a solubility promoter for mercaptans and a resinous emulsifier accumulated in the course of treating hydrocarbon distillates with said solution, the steps comprising diluting said solution with about 3 volumes of distilled water, and contacting the resulting diluted solution with .25% to 1.5% by weight of a solid adsorbent comprising magnesium oxide, under conditions to entrain the resinous emulsifier with the adsorbent, and separating said adsorbent containing entrained emulsifier from said solution, the latter having retained said solubility promoter.

ALAN C. NIXON.
ORRIS L. DAVIS.